United States Patent [19]

Steffes et al.

[11] Patent Number: 4,989,640

[45] Date of Patent: Feb. 5, 1991

[54] DIVERTER VALVE

[75] Inventors: Rudolf Steffes, Mueckeln; Harald Meyer, Wittlich, both of Fed. Rep. of Germany

[73] Assignee: American Standard Inc., New York, N.Y.

[21] Appl. No.: 285,824

[22] Filed: Dec. 16, 1988

[51] Int. Cl.⁵ ............................................. F16K 11/044
[52] U.S. Cl. ................................. 137/625.5; 137/872
[58] Field of Search .................. 137/625.48, 872, 625.5

[56] References Cited

U.S. PATENT DOCUMENTS

| | | | |
|---|---|---|---|
| 1,937,246 | 11/1933 | Reedy | 137/625.5 X |
| 3,260,504 | 7/1966 | Mojonnier et al. | 137/625.5 X |
| 3,382,894 | 5/1968 | Shurtleff et al. | 137/625.5 |
| 3,441,054 | 4/1969 | Mellan | 137/872 |
| 4,224,962 | 9/1980 | Orszullok | 137/625.5 X |

FOREIGN PATENT DOCUMENTS

| | | |
|---|---|---|
| 1428407 | 2/1975 | Fed. Rep. of Germany . |
| 7810761 | 4/1976 | Fed. Rep. of Germany . |
| 2256659 | 5/1976 | Fed. Rep. of Germany . |
| 2103975 | 10/1976 | Fed. Rep. of Germany . |
| 2651559 | 11/1976 | Fed. Rep. of Germany . |
| 2253177 | 6/1975 | France . |

*Primary Examiner*—Arnold Rosenthal
*Attorney, Agent, or Firm*—Blum Kaplan

[57] ABSTRACT

A diverter valve assembly for a sanitary fitting having a spindle, which operates the diverter valve and includes a shiftable valve cone which selectively diverts water to the various outlet points, is disclosed.

5 Claims, 3 Drawing Sheets

DIVERTER VALVE

BACKGROUND OF THE DISCLOSURE

1. Field of the Invention

The invention is concerned with a diverter valve for sanitary fittings and, more particularly, to a diverter valve which includes a chamber into which the water supply passages communicate with the various outlets, and are selectively opened and closed by a shiftable actuating means which directs the water to the various outlets without discharge resistance.

2. Description of Prior Art

Typical tub-filling and shower valve assemblies are equipped with aerator jets. These throttle the water throughput to such an extent that a damming-up occurs, and this effects easy operation of the diverter valve. The rate of throughput in this connection is approximately 35 liters per minute with a water pressure of 5 bar.

SUMMARY OF THE INVENTION

An object of the invention is to provide a diverter valve to divert the flow of water to various outlets in which the flow capacity is approximately 100 to 120 liters per minute at 5 bar without encountering discharge resistance, at the same time, maintaining ease of operation of the diverter valve.

Another object of the invention is to provide a diverter valve having a retarding disc that is attached to a spindle which is operated by actuating means, and which diverter valve is in the form of a movable valve cone that is mounted on the spindle. In addition, a valve face which accommodates the valve cone is provided at the entrance area of each duct leading to the various discharge outlets.

A further object of the invention is to provide a diverter valve which reduces water hammer when operating the diverter valve in resistance-free flow. The switchover pressure is reduced at higher pressures, and the switchover can be carried out without energy expenditure.

BRIEF DESCRIPTION OF THE DRAWINGS

The invention is described in more detail with the aid of the drawings.

DETAILED DESCRIPTION OF THE PREFERRED EMBODIMENT

Figure 1:
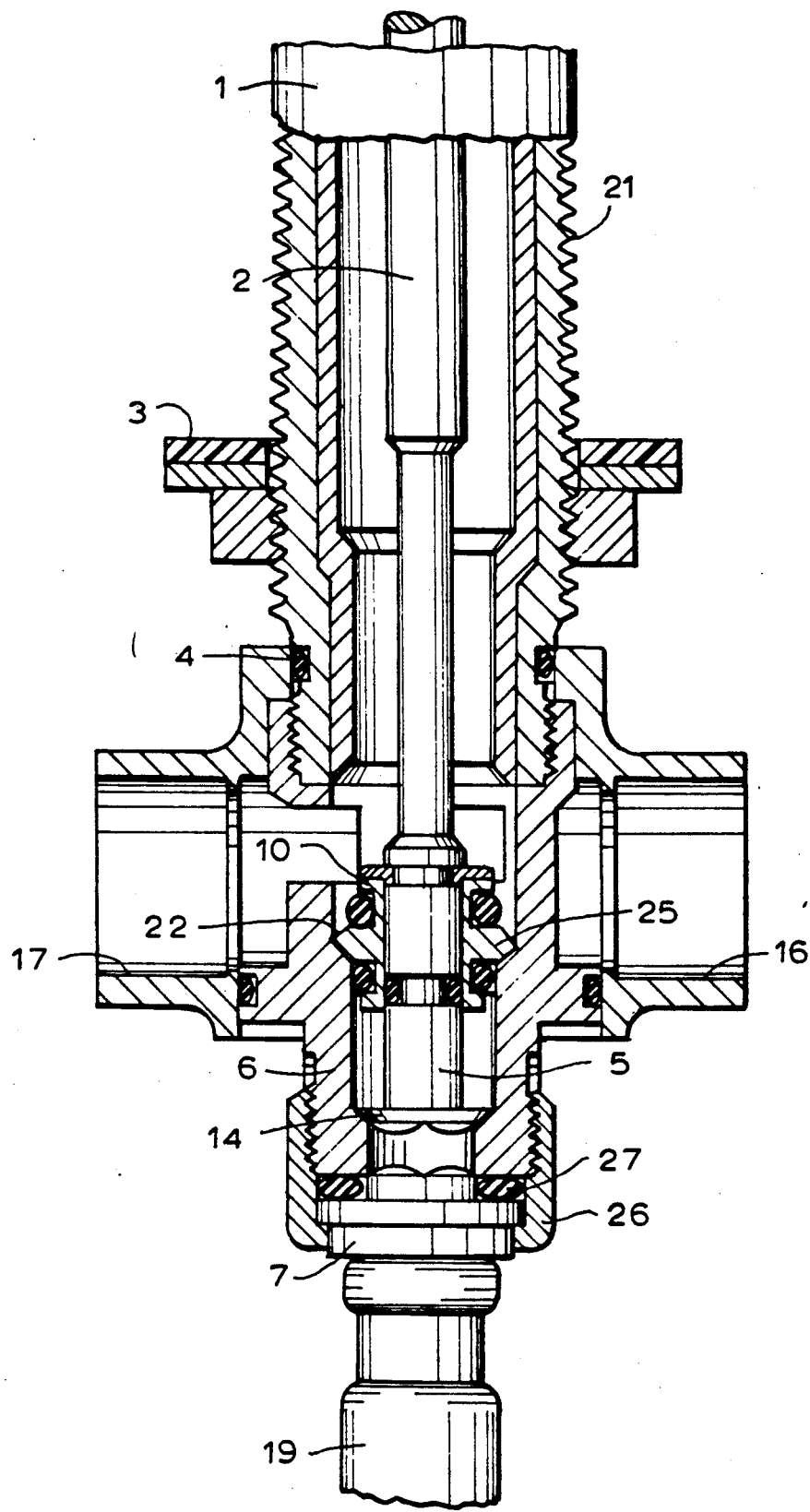
FIG. 1 shows the position of the shutoff element in filling a bath tub.
Figure 2:
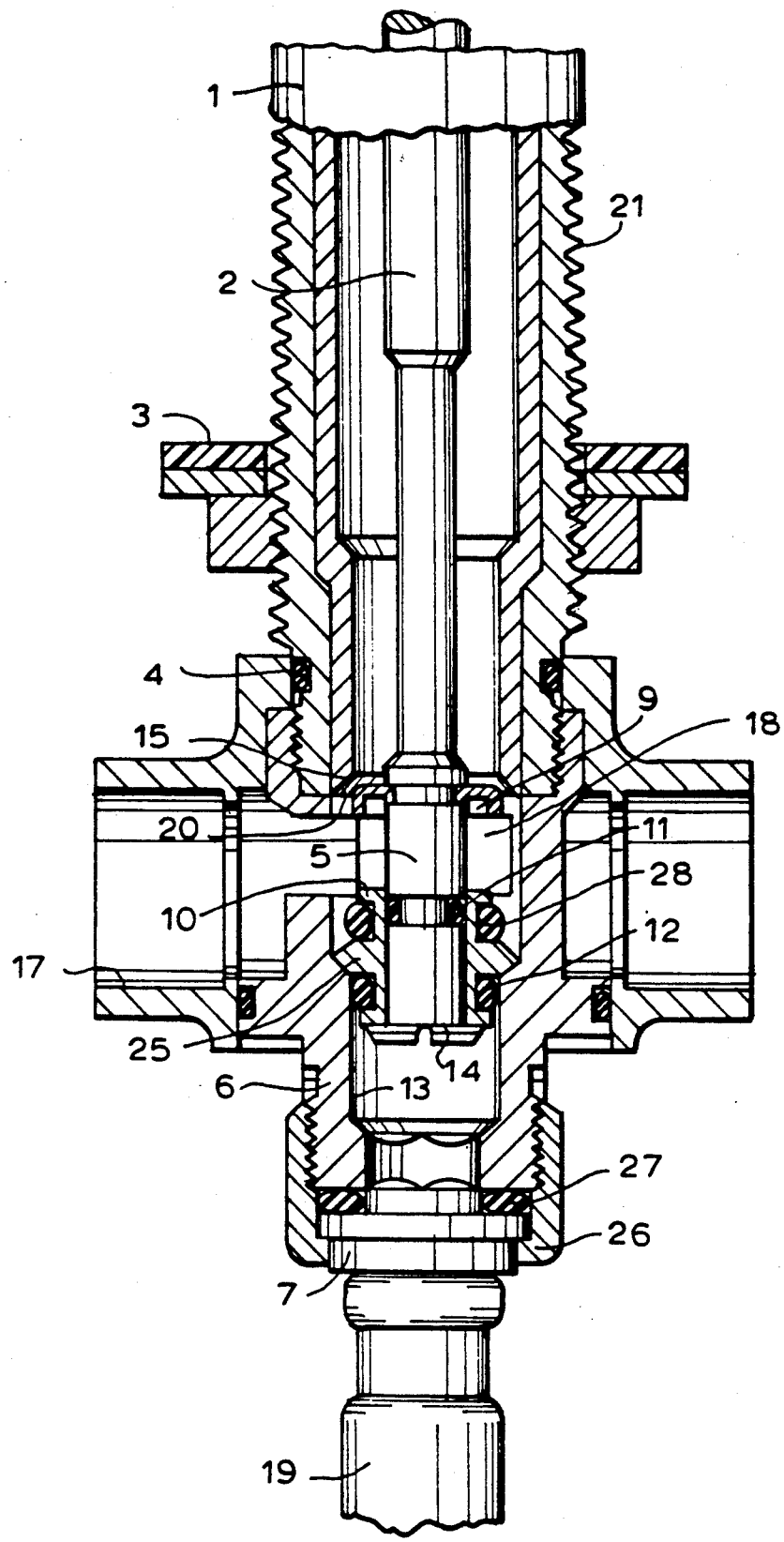
FIG. 2 shows the switchover and throttle positions.

The fitting is made up of an outflow pipe or spout 1 which has a screw thread 21 on its underside, and is attached to a washstand, not shown. A covering or escutcheon is fastened in a watertight fit by a planar seal 3. Water supply ducts 16, 17 for the feed of cold and warm water, respectively, are coupled to connector piece 6, having a chamber 18 into which the outflow pipe 1 opens and to which a duct 19, which leads to a further water outlet point, is also connected. Flexible pressure tubing 19 is represented in the drawing, such as hose which carries a water spray device at one end, not shown. The connection of the flexible pressure tubing 19 is effected via a connector 7 inserting a seal 27 and a nut 26. Seals 4 are intended for the supply ducts 16 and 17.

A spindle 2, which carries a shutoff element 5, is mounted axially in outflow pipe 1. This shutoff element has a retarding disc 9 which is fixed to spindle 2, and socket 10 which are movable on the spindle. Socket 10 includes valve cone 25 on the outside and is in the shape of a rib, with two surfaces inclined towards one another. The socket also carries an O-ring 12 which is located on the inner side of cylinder seal 13. Provision is made for a seal 11 positioned between the inner side of the socket 10 and the spindle 2, and a buffer 14 on the end of the spindle.

In FIG. 1, the shutoff element 5 is in a position enabling the water flowing in through the supply ducts 16 and/or 17 to be diverted via the interior of the outflow pipe 1, i.e. the water can be used to fill a bath tub, for example. In this position, the valve cone 25 lies with its undersurface on the valve seat 22 of the connector piece 6, and the buffer 14 has been separated from the socket 10 and is in its lowest position, which means that the retarder disc 9 is also in its lowest position.

Figure 3:
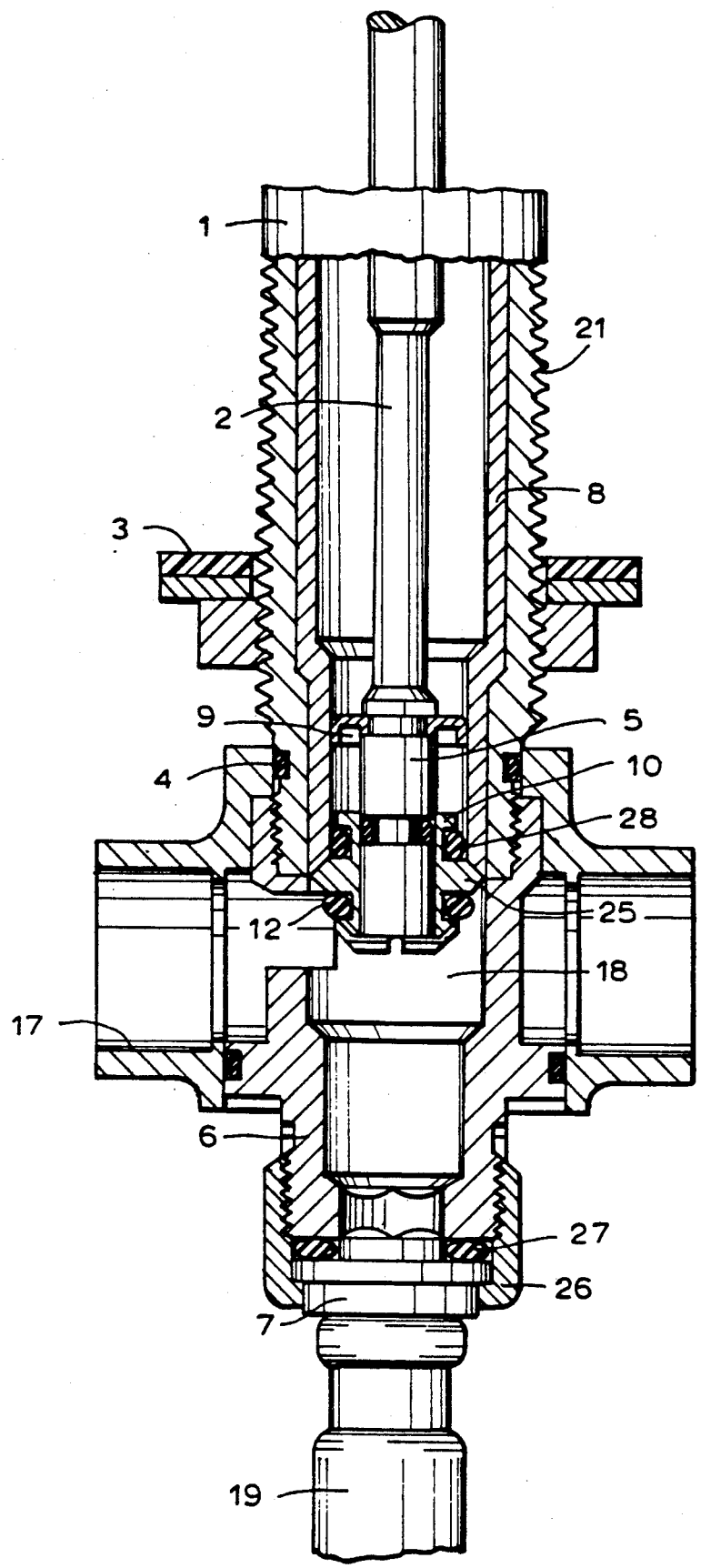
FIG. 3 shows the diverter valve position when shifted to the shower or sprinkler mode.

When the diverter valve is shifted, spindle 2 is moved upwards until the buffer 14 comes into contact with the socket 10. The retarder disc 9 thus moves close up to the valve seat 15 on the outflow pipe 1. An annular gap 29 remains between this valve seat 15 and the retarder disc 9. Through the rubbing of the O-ring 12 on the side of the seal cylinder 13, the valve cone 25 stays on the valve seat 22. A prerequisite for this is also that the pressure surface of the retarder disc 9 is somewhat smaller than that of the valve cone 25. In this position, the water flow is limited to approximately 30 liters, depending on pressure. Hereupon, the switchover can be carried out to the full without great energy expenditure and without encountering water hammer so that the position of the diverter valve, according to FIG. 3, is reached, whereby the valve cone 25 is now on the upper valve seat 15, and the retarder disc 9 has moved into the interior of the outflow pipe 1. The ring canal 20 is sealed by seal 28. At this point, the water passes freely into the flexible pressure tubing 19 through the connector piece 6 and the chamber 18.

In the case of shifting the diverter valve from the bath tub filling position to the sprinkler or spray position, throttling through the post-switched hand sprinker, maximum throughput 20 liters per minute, is not necessary. It is, of course, also possible to connect the diverter valve assembly to other devices, for example, washstand, mouth spray, bidet, shower, etc. The principle explained may also be used as an automatic diverter system, and it is possible to interchange the entire diverter system as a unit. For this purpose, there is a diverter exchange socket 8 in the outflow pipe 1 which can be removed axially with the shutoff element 5, and which can be replaced by another device. By pulling or pushing spindle 2 with a uniform force, pressure shock or water hammer is avoided even at higher water pressures.

What is claimed is:

1. A diverter valve assembly for diverting water from hot and cold water supply passages between at least two water outlet passages comprising:

a valve body having a chamber and at least two water outlet passages which communicate with said chamber and said hot and cold water supply passages;

a diverter valve actuating means positioned in said valve body to selectively open and close said at least two water outlet passages to said hot and cold water supply passages;

said diverter valve actuating means including a shiftable valve assembly having a valve cone thereon slidably supported in said chamber between a first position where said hot and cold water supply passages are open to one of said water outlet passages and a second position where said hot and cold water supply passages are open to the other of said water outlet passages, spindle means slidably supported in said valve body and extending slidably through said shiftable valve assembly for moving said shiftable valve assembly between its first and second positions, said spindle means being moved through said shiftable valve assembly for a predetermined distance before moving said shiftable valve assembly to open and close one of said water outlet passages to divert the flow of water therethrough, while reciprocably closing and opening the other of said water outlet passages.

2. The diverter valve, in accordance with claim 1, wherein said valve cone is mounted on said actuating means and is displaceable in said chamber in said valve body, said valve cone being in the shape of a rib having two opposing surfaces inclined towards one another, said shiftable valve assembly including a ring seal on its outer surface which cooperates with said valve cone.

3. The diverter valve, in accordance with claim 2, wherein said actuating means includes a retarder disc supported on said spindle means having a surface smaller than the surface area of said rib.

4. The diverter valve, in accordance with claim 3, wherein said chamber has a diameter which is larger than the diameter of said retarder disc.

5. The diverter valve, in accordance with claim 3, wherein when said spindle means is moved through said predetermined distance, a channel is provided between said retarder disc and said one of said water outlet passages to throttle the water passing therethrough.

* * * * *